(12) United States Patent
Ganiger et al.

(10) Patent No.: US 11,572,794 B2
(45) Date of Patent: Feb. 7, 2023

(54) INNER SHROUD DAMPER FOR VIBRATION REDUCTION

(71) Applicant: General Electric Company, Schenectady, NY (US)

(72) Inventors: Ravindra Shankar Ganiger, Bengaluru (IN); Sam J. Stoughton, West Chester, OH (US); Kevin Lee Kirkeng, West Chester, OH (US); Jacob P. Miller, West Chester, OH (US); Reddi Hari Prasad Reddy Mylapalli, Bengaluru (IN); Paul Trimby, Lynn, MA (US); Jaeyong Kim, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/143,851

(22) Filed: Jan. 7, 2021

(65) Prior Publication Data
US 2022/0213794 A1    Jul. 7, 2022

(51) Int. Cl.
*F01D 5/22* (2006.01)
*F02C 7/28* (2006.01)

(52) U.S. Cl.
CPC ............ *F01D 5/225* (2013.01); *F02C 7/28* (2013.01); *F05D 2240/55* (2013.01); *F05D 2250/283* (2013.01); *F05D 2260/31* (2013.01); *F05D 2260/96* (2013.01)

(58) Field of Classification Search
CPC ........ F01D 5/225; F01D 11/02; F01D 11/001; F01D 5/08; F02C 7/28; F05D 2240/55; F05D 2250/283; F05D 2260/31; F05D 2260/96
See application file for complete search history.

(56) References Cited

U.S. PATENT DOCUMENTS

| | | | | |
|---|---|---|---|---|
| 2,689,107 | A | * | 9/1954 | Odegaard ................ F01D 5/16 416/500 |
| 2,862,686 | A | * | 12/1958 | Bartlett .................... F01D 5/16 416/500 |
| 3,455,268 | A | | 7/1969 | Gordon |
| 4,285,633 | A | * | 8/1981 | Jones .................... F01D 11/001 415/191 |
| 4,416,349 | A | * | 11/1983 | Jacobs ...................... B64C 3/18 428/116 |
| 4,768,922 | A | | 9/1988 | Kozak et al. |
| 5,277,544 | A | | 1/1994 | Naudet |
| 6,790,000 | B2 | | 9/2004 | Wolf |
| 7,291,946 | B2 | * | 11/2007 | Clouse ..................... F01D 5/26 310/51 |
| 7,654,797 | B2 | | 2/2010 | Boegli et al. |
| 7,713,022 | B2 | | 5/2010 | Major et al. |
| 8,087,881 | B1 | * | 1/2012 | Cardoso, III ............ F01D 5/26 415/119 |
| 9,334,751 | B2 | | 5/2016 | Dube et al. |

(Continued)

*Primary Examiner* — Kenneth Bomberg
*Assistant Examiner* — Ryan C Clark
(74) *Attorney, Agent, or Firm* — Hanley, Flight and Zimmerman, LLC (57) ABSTRACT

Methods, apparatus, systems and articles of manufacture are disclosed. An inner shroud damper for a gas turbine engine includes: at least one carrier including a joint to couple to an inner shroud, the at least one carrier having a first side and a second side, and at least one mass damper coupled to the at least one carrier.

18 Claims, 5 Drawing Sheets

(56) References Cited

U.S. PATENT DOCUMENTS

| | | | |
|---|---|---|---|
| 9,410,443 B2 | 8/2016 | Dube et al. | |
| 9,777,594 B2 | 10/2017 | Lang | |
| 9,790,809 B2* | 10/2017 | Dube | F01D 5/26 |
| 9,903,218 B2 | 2/2018 | Hafner et al. | |
| 10,107,122 B2 | 10/2018 | Maliniak | |
| 10,107,125 B2 | 10/2018 | Rioux | |
| 10,119,474 B2* | 11/2018 | Hyland | F01D 25/04 |
| 2014/0140822 A1 | 5/2014 | Capozzi et al. | |
| 2015/0098802 A1 | 4/2015 | Farineau et al. | |
| 2016/0102570 A1* | 4/2016 | Wilson | F16F 15/06 |
| | | | 277/411 |
| 2016/0341068 A1 | 11/2016 | Robertson, Jr. et al. | |
| 2018/0112555 A1* | 4/2018 | Humhauser | F04D 29/563 |
| 2019/0032497 A1 | 1/2019 | Puram et al. | |
| 2020/0355087 A1* | 11/2020 | Moreau | F01D 11/005 |

* cited by examiner

FIG. 5B

INNER SHROUD DAMPER FOR VIBRATION REDUCTION

FIELD OF THE DISCLOSURE

This disclosure relates generally to gas turbines, and, more particularly, to an inner shroud damper for vibration reduction.

BACKGROUND

A gas turbine engine generally includes, in serial flow order, an inlet section, a compressor section, a combustion section, a turbine section, and an exhaust section. In operation, air enters the inlet section and flows to the compressor section where one or more axial compressors progressively compress the air until it reaches the combustion section, thereby creating combustion gases. The combustion gases flow from the combustion section through a hot gas path defined within the turbine section and then exit the turbine section via the exhaust section.

BRIEF SUMMARY

Methods, apparatus, systems, and articles of manufacture to reduce turbine engine vibration are disclosed.

Certain examples provide an apparatus including at least one arm including a joint to couple to an inner shroud, the at least one arm having a first side and a second side, and at least one mass damper coupled to the at least one arm.

Certain examples provide a gas turbine engine including an inner shroud, a seal box coupled to the inner shroud, and an inner shroud damper including at least one arm disposed inside the seal box, the at least one arm including a joint to couple to the inner shroud and at least one mass damper coupled to the at least one arm.

Certain examples provide an apparatus including means for coupling at least one arm to an inner shroud and means for damping engine vibration, the means for damping coupled to the at least one arm.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

DETAILED DESCRIPTION

Engine and component vibration occurs during normal engine operation. For example, forces acting on one or more airfoils (e.g., vanes, blades, etc.) during operation of the engine can cause the one or more airfoils to vibrate an undesirable amount, introducing stress, and eventual wear, on the one or more airfoils. Component vibration mode responses to the engine vibration or other sources include airfoil mode response (e.g., one airfoil is vibrating), soldier mode response (e.g., one or more airfoils attached to the shroud are vibrating together), etc. The vibration mode responses cause eventual wear on the airfoils (e.g., trunnion cracking, trunnion locking, etc.). There is a continuing need to reduce the vibration response of the component. Certain examples provide an inner shroud damper that absorbs relatively high energy and acts anti-mode for certain vibration frequencies, improving durability of the one or more airfoils and associated engines.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe an example implementation and not to be taken limiting on the scope of the subject matter described in this disclosure. Certain features from different aspects of the following description may be combined to form yet new aspects of the subject matter discussed below.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

The terms "upstream" and "downstream" refer to the relative direction with respect to fluid flow in a fluid pathway. For example, "upstream" refers to the direction from which the fluid flows, and "downstream" refers to the direction to which the fluid flows. As used herein, "vertical" refers to the direction perpendicular to the ground. As used herein, "horizontal" refers to the direction parallel to the centerline of the gas turbine engine 100. As used herein, "lateral" refers to the direction perpendicular to the axial vertical directions (e.g., into and out of the plane of FIGS. 1, 2, etc.).

Various terms are used herein to describe the orientation of features. As used herein, the orientation of features, forces and moments are described with reference to the axial direction, radial direction, and circumferential direction of the vehicle associated with the features, forces and moments. In general, the attached figures are annotated with a set of axes including the axial axis A, the radial axis R, and the circumferential axis C.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Gas turbine engines include rows of vanes, rows of rotor blades, etc. In some examples, the vanes of gas turbine engines are variable stator vanes ("VSV") which allow individual stator vanes to rotate about their respective axes (e.g., the radial axis). In some prior designs, VSV and shroud assemblies include one 360 degree segment, two 180 degree segments, or other number of segments, which form a single row of stators associated with a particular stage of the compressor. While examples disclosed herein are described with reference to stators in the compressor, the examples disclosed herein can be applied to stators in any section of the gas turbine engine.

In some examples, the rotation of the VSVs is controlled by trunnions disposed within the shroud and/or a seal box beneath the shroud and VSV. As used herein, a "trunnion" is a part and/or feature that permits a rotation of a part and/or feature support thereon and/or thereby. In some prior techniques, testing has shown that the trunnions can have unfavorable cracking and fatigue depending on the vibration response mode (e.g., a soldier mode response, etc.). The vibration response during engine operation is based at least in part on conflicting design parameters of the VSVs (e.g., stiffness, durability, etc.) in view of the shroud end mass. Such responses can cause the trunnions to lock (e.g., stop rotating) within the seal box, which decreases engine performance and fatigues the VSV. For example, during particular vibration responses, the cylindrical shape of the trunnion may deform in a manner that causes three points of the trunnion to contact the shroud, which prevents the trunnion from rotating, thereby locking the VSV. Additionally, trunnion locking can cause fatigue and cracking in the cylindrical trunnion.

Examples disclosed herein can reduce undesired effects caused by these distortions in the engine based on a reduction of engine vibration. By coupling an inner mass damper to the inner shroud of the gas turbine engine, for example, the vibration response is mitigated. The inner mass damper can include one or more arms, one or more mass dampers, etc.

Reference now will be made in detail to examples of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one example can be used with another example to yield a still further example. Thus, it is intended that the present invention covers such modifications and variations as come within the scope of the appended claims and their equivalents.

Figure 1:
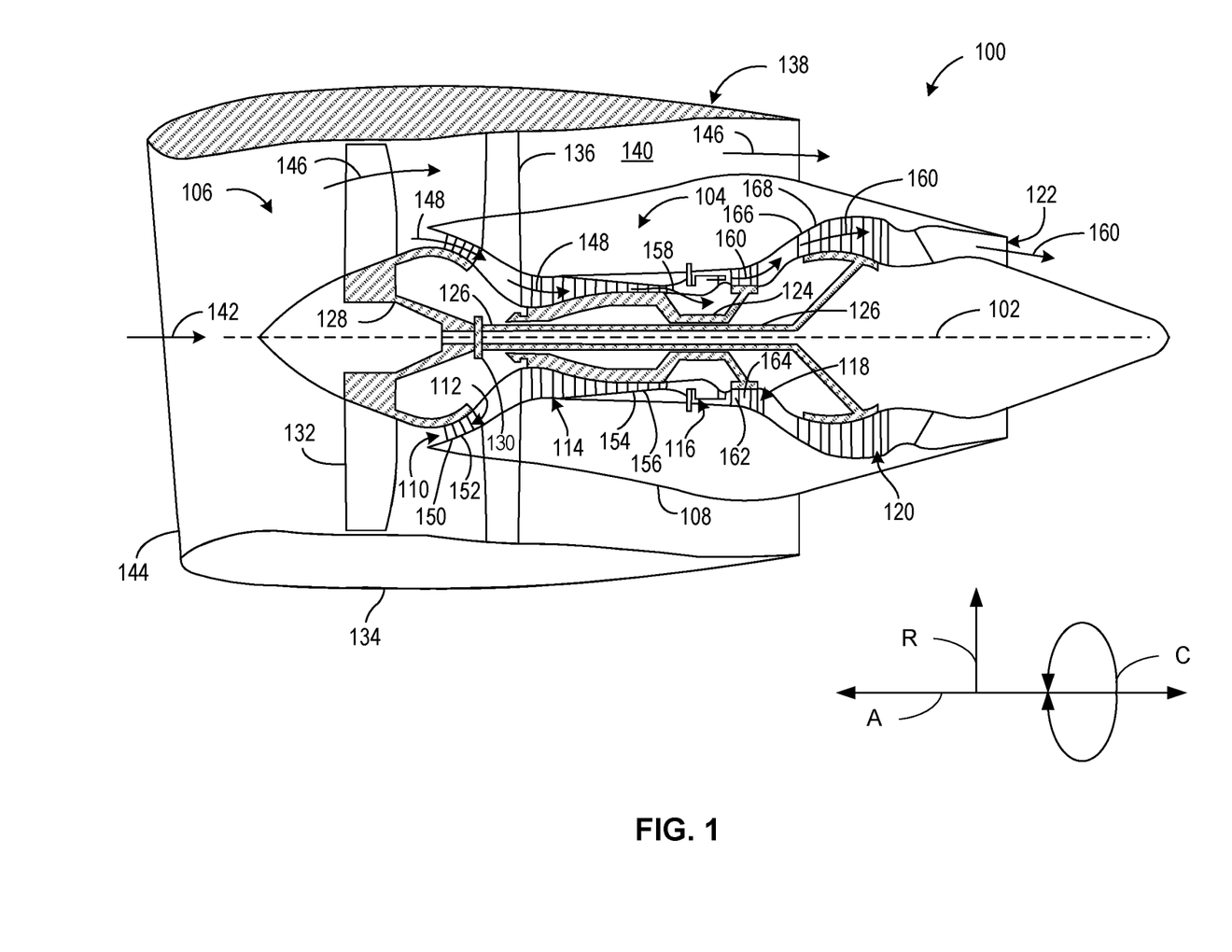
FIG. 1 illustrates an example gas turbine engine.

FIG. 1 is a schematic cross-sectional view of a prior art turbofan-type gas turbine engine 100 ("turbofan 100"). As shown in FIG. 1, the turbofan 100 defines a longitudinal or axial centerline axis 102 extending therethrough for reference. In general, the turbofan 100 may include a core turbine or gas turbine engine 104 disposed downstream from a fan section 106.

The core turbine 104 generally includes a substantially tubular outer casing 108 that defines an annular inlet 110. The outer casing 108 can be formed from a single casing or multiple casings. The outer casing 108 encloses, in serial flow relationship, a compressor section having a booster or low pressure compressor 112 ("LP compressor 112") and a high pressure compressor 114 ("HP compressor 114"), a combustion section 116, a turbine section having a high pressure turbine 118 ("HP turbine 118") and a low pressure turbine 120 ("LP turbine 120"), and an exhaust section 122. A high pressure shaft or spool 124 ("HP shaft 124") drivingly couples the HP turbine 118 and the HP compressor 114. A low pressure shaft or spool 126 ("LP shaft 126") drivingly couples the LP turbine 120 and the LP compressor 112. The LP shaft 126 may also couple to a fan spool or shaft 128 of the fan section 106. In some examples, the LP shaft 126 may couple directly to the fan shaft 128 (i.e., a direct-drive configuration). In alternative configurations, the LP shaft 126 may couple to the fan shaft 128 via a reduction gear 130 (e.g., an indirect-drive or geared-drive configuration).

As shown in FIG. 1, the fan section 106 includes a plurality of fan blades 132 coupled to and extending radially outwardly from the fan shaft 128. An annular fan casing or nacelle 134 circumferentially encloses the fan section 106 and/or at least a portion of the core turbine 104. The nacelle 134 is supported relative to the core turbine 104 by a plurality of circumferentially-spaced apart outlet guide vanes 136. Furthermore, a downstream section 138 of the nacelle 134 can enclose an outer portion of the core turbine 104 to define a bypass airflow passage 140 therebetween.

As illustrated in FIG. 1, air 142 enters an inlet portion 144 of the turbofan 100 during operation thereof. A first portion 146 of the air 142 flows into the bypass flow passage 140, while a second portion 148 of the air 142 flows into the inlet 110 of the LP compressor 112. One or more sequential stages of LP compressor stator vanes 150 and LP compressor rotor blades 152 coupled to the LP shaft 126 progressively compress the second portion 148 of the air 142 flowing through the LP compressor 112 en route to the HP compressor 114. Next, one or more sequential stages of HP compressor stator vanes 154 and HP compressor rotor blades 156 coupled to the HP shaft 124 further compress the second portion 148 of the air 142 flowing through the HP compressor 114. This provides compressed air 158 to the combustion section 116 where it mixes with fuel and burns to provide combustion gases 160.

The combustion gases 160 flow through the HP turbine 118 in which one or more sequential stages of HP turbine stator vanes 162 and HP turbine rotor blades 164 coupled to the HP shaft 124 extract a first portion of kinetic and/or thermal energy from the combustion gases 160. This energy extraction supports operation of the HP compressor 114. The combustion gases 160 then flow through the LP turbine 120 where one or more sequential stages of LP turbine stator vanes 166 and LP turbine rotor blades 168 coupled to the LP shaft 126 extract a second portion of thermal and/or kinetic energy therefrom. This energy extraction causes the LP shaft 126 to rotate, thereby supporting operation of the LP compressor 112 and/or rotation of the fan shaft 128. The combustion gases 160 then exit the core turbine 104 through the exhaust section 122 thereof.

Along with the turbofan 100, the core turbine 104 serves a similar purpose and sees a similar environment in land-based gas turbines, turbojet engines in which the ratio of the first portion 146 of the air 142 to the second portion 148 of the air 142 is less than that of a turbofan, and unducted fan engines in which the fan section 106 is devoid of the nacelle 134. In each of the turbofan, turbojet, and unducted engines, a speed reduction device (e.g., the reduction gearbox 130) may be included between any shafts and spools. For example, the reduction gearbox 130 may be disposed between the LP shaft 126 and the fan shaft 128 of the fan section 106.

Figure 2:
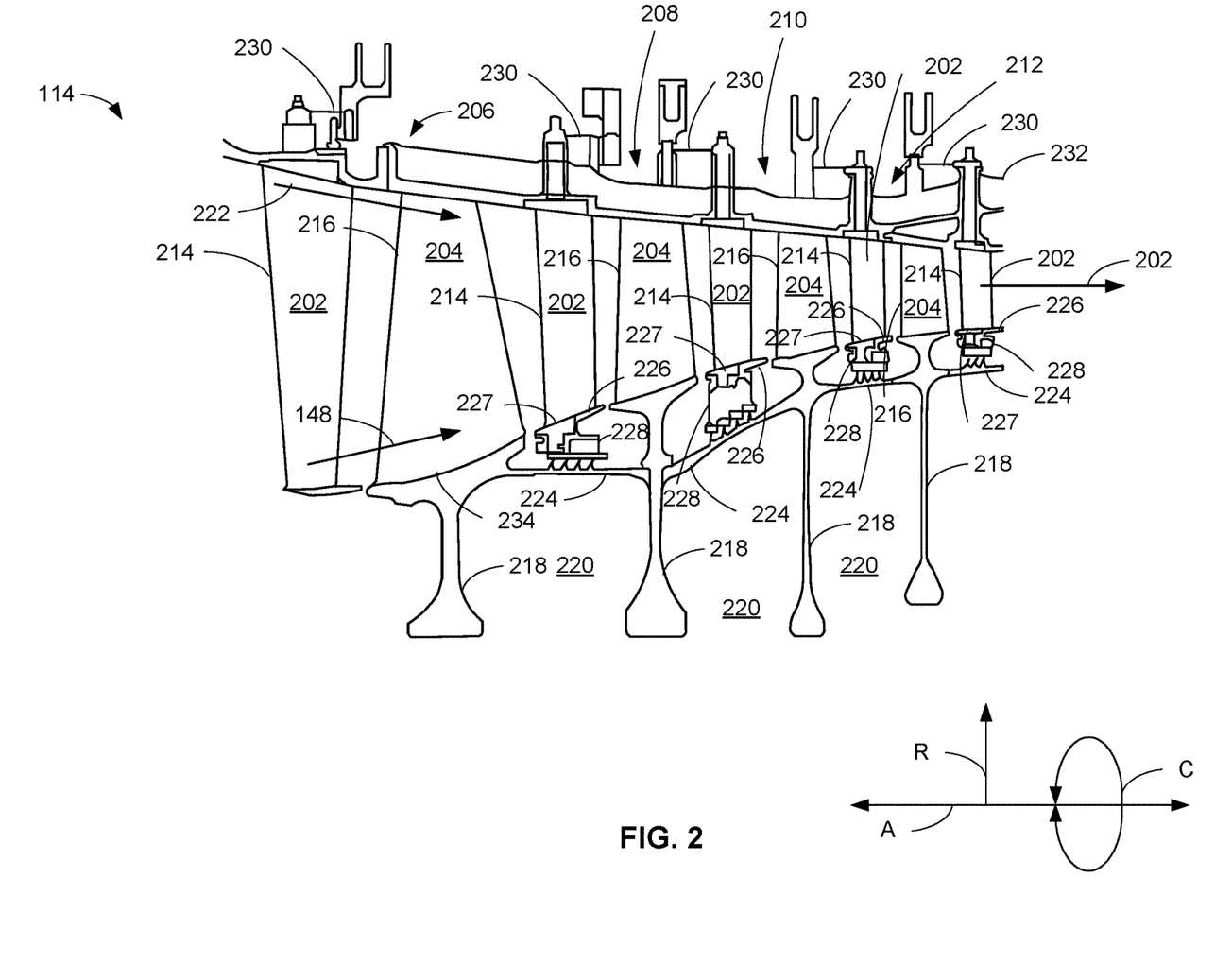
FIG. 2 illustrates an example cross-sectional side view of the high pressure compressor of the turbofan shown in FIG. 1.

FIG. 2 illustrates an example cross-sectional side view of the HP compressor 114 of the turbofan 100 shown in FIG. 1. The HP compressor 114 includes one or more sequential stages. The illustrated example of FIG. 2 includes a first stage 206, a second stage 208 positioned axially downstream from the first stage 206, a third stage 210 positioned axially downstream from the second stage 208, and a fourth stage 212 positioned axially downstream from the third stage 210. Although, the HP compressor 114 can include more or less stages as is necessary or desired.

Each of the stages 206, 208, 210, 212 include a row 214 of the stator vanes 202 and a row 216 of the rotor blades 204. The stator vanes 202 in the row 214 are circumferentially spaced apart. In examples disclosed herein, the stator vanes 202 are variable stator vanes ("VSVs 202"), which can be coupled to one or more synchronization rings or brackets, for example. The synchronization rings or brackets are coupled to an actuator to at least partially rotate the VSVs 202 about the radial axis. For example, the VSVs 202 are coupled to a VSV lever arm 230. In examples disclosed herein, the VSVs 202 can rotate about an axis in the radial direction R to mitigate compressor stall or surge. Each of the VSVs 202 includes a trunnion 227 to couple with a corresponding inner shroud 226. In the illustrated example of FIG. 2, the trunnion 227 is disposed radially inward from the engine case 232. In the illustrated example of FIG. 2, the inner shroud 226 is coupled to a seal box 228.

Similarly, the rotor blades 204 in the row 216 are also circumferentially spaced apart. In the example shown in FIG. 2, the row 216 of rotor blades 204 is positioned axially downstream from the row 214 of stator vanes 202. Each of the rotor blades 204 includes a connection portion 234 (not labeled with respect to the rotor blades 204 of the stages 208, 210, 212) extending radially inward from the engine case 232 for coupling with a corresponding rotor disc 218. The connection portion can include an axial dovetail, a circumferential dovetail, a fir tree, or other connection portion shape.

The rows 214 of the stator vanes 202 and the rows 216 of the rotor blades 204 of each of the stages 206, 208, 210, 212 collectively define a compressed gas path 222 through which the second portion 148 of the air 142 flows. In particular, the stator vanes 202 direct the second portion 222 of the air 142 onto the rotor blades 204, which impart kinetic energy into the second portion 148 of the air 142. In this respect, the rotor blades 204 convert the second portion 148 of the air 142 flowing through the HP compressor 114 into the compressed air 158. Outlet guide vanes, if included, direct the flow of compressed air 158 into the combustion section 116.

A coupling, such as a labyrinth seal 224, is positioned between each adjacent pair of rotor discs 218. In the example shown in FIG. 2, for example, a first labyrinth seal 224 is positioned between the rotor discs 218 of the first and the second stages 206, 208. A second labyrinth seal 224 is positioned between the rotor discs 218 of the second and the third stages 208, 210. A third labyrinth seal 224 is positioned between the rotor discs 218 of the third and the fourth stages 210, 212. A fourth labyrinth seal 224 is positioned axially downstream of the rotor discs 218 of the fourth stage 212. The labyrinth seals 224 prevent interstage leakage of the second portion 148 of the air 142 across the compressor stages 206, 208, 210, 212. Furthermore, the labyrinth seals 224 permit relative rotation between each of the rows 214 of stator vanes 202 and the adjacent rotor discs 218. This allows the rotor blades 204 to rotate, while the stator vanes 202 remain stationary. In other examples, the coupling may be a brush seal (not shown) or any type of suitable seal. In this respect, all of the rotor discs 218 rotate in unison when the HP turbine 118 drives the HP shaft 124. Furthermore, each of the labyrinth seals 224 in combination with each corresponding adjacent pair of rotor discs 218 coupled thereby define a rotor disc space 220.

Figure 3:
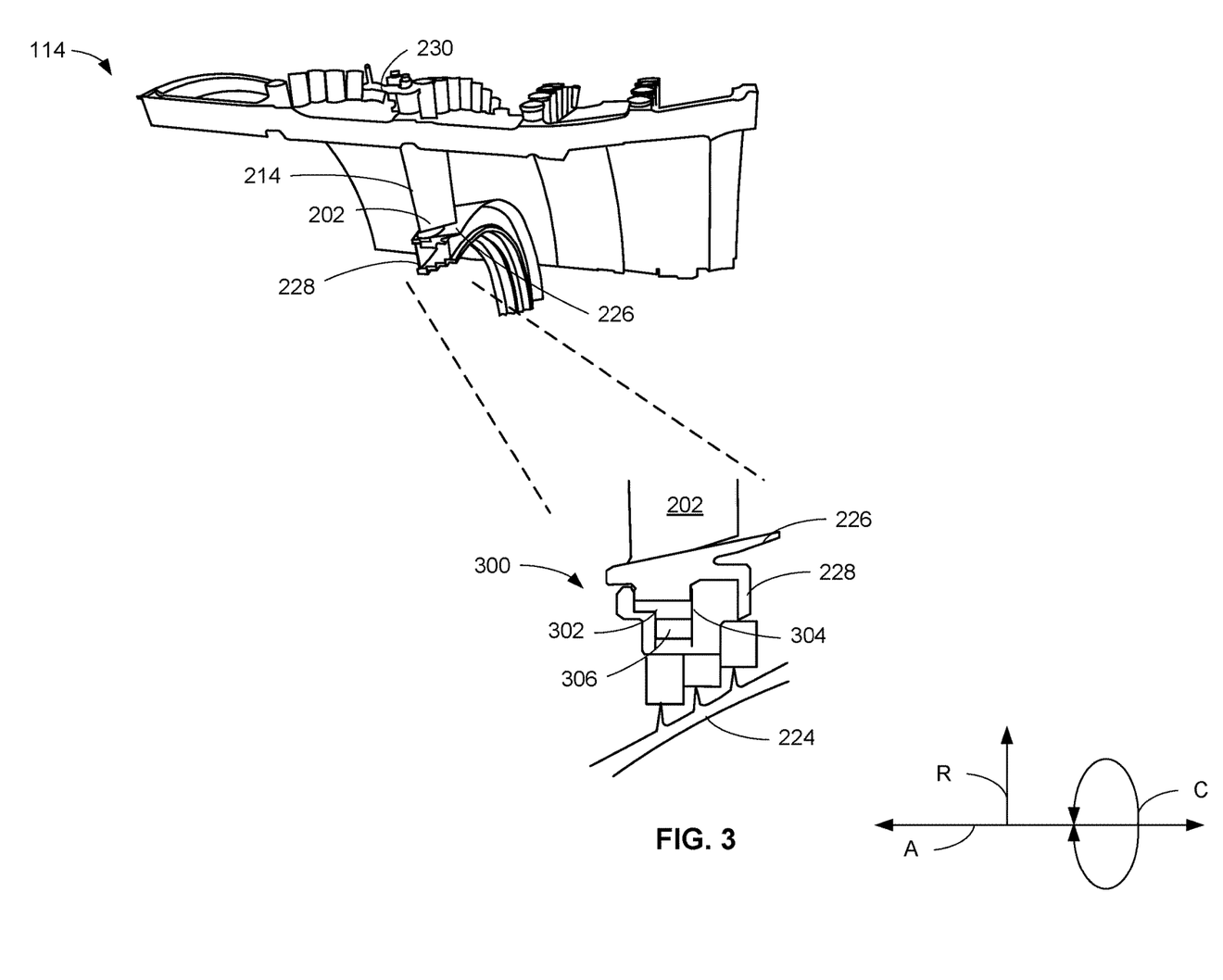
FIG. 3 illustrates an example cross-sectional view of a first example inner shroud damper.

FIG. 3 illustrates an example cross-sectional view of an example first inner shroud damper 300. The illustrated example of FIG. 3 includes a perspective view of the cross-sectional side view of the HP compressor 114 shown in FIGS. 1 and 2. The HP compressor 114 includes a VSV 202 of the row 214 of the second stage 208. However, the rows 214 of the stages 206, 210, 212 can additionally or alternatively be included. While only one VSV 202 is illustrated in FIG. 3, it is to be understood that one or more VSVs 202 can be included. The HP compressor 114 includes the inner shroud 226 and the seal box 228, including the inner shroud damper 300.

The inner shroud damper 300 includes a first carrier 302, a second carrier 304, and a mass damper 306. In examples disclosed herein, the first carrier 302 and the second carrier 304 act as a carrier to the mass damper 306. For example, the carriers 302, 304 act as an interface between the mass damper 306 and the inner shroud 226. The carriers 302, 304 can be arms, segments, etc. However, other constructions and/or methods can be used to couple the mass damper 306 to the inner shroud 226. The carriers 302, 304 are disposed inside the inner shroud 226 and the seal box 228. In some examples, the carriers 302, 304 are curved beam structures such that they run through the seal housing (e.g., the seal box 228) of the inner shroud 226 circumferentially. However, the carriers 302, 304 can be other shapes that integrate with the inner shroud 226. The carriers 302, 304 can be cantilever bolted arms coupled to the inner shroud 226. The carrier, as illustrated by the carriers 302, 304, can be any material suitable for the environment and compatible within the shroud and damping systems. In some examples, the carriers 302, 304 are steel. However, the carriers 302, 304 can additionally or alternatively be alloys of titanium, iron, nickel with adequate strength, fatigue, and/or other material characteristics, etc. for vibration damping.

The mass dampers 306 are disposed between the first carrier 302 and the second carrier 304. In examples disclosed herein, the mass dampers 306 are bolted, brazed, and/or retained to the carriers 302, 304. For example, the mass dampers 306 are integrally brazed or otherwise retained to the carriers 302, 304. In some examples, the mass dampers 306 and the carriers 302, 304 are integrally brazed to the inner shroud 226. In some examples, the mass dampers 306 are honeycomb structures (e.g., an array of hollow cells formed between walls). In some examples, the mass dampers 306 include one or more layers of the honeycomb structures. However, the mass dampers 306 are additionally or alternatively an inertial mass, a viscoelastic material (e.g., rubber, silicone, etc.), etc.

In examples disclosed herein, the mass dampers 306 provide mass damping behavior during engine operation. For example, the mass dampers 306 absorb energy (e.g., vibrational energy) during engine operation and act anti-mode to certain vibration responses. That is, the VSVs 202 vibrate at a first frequency during normal engine operation based on the design parameters of the VSVs 202 (e.g., durability, stiffness, etc.). The mass dampers 306 can be tuned (e.g., designed to have a certain durability, stiffness, weight, etc.) to vibrate at a second frequency during normal engine operation such that the second frequency interferes with the first frequency. That is, the mass dampers 306 can be tuned to act anti-mode to the vibration of the gas turbine engine 100. For example, the gas turbine engine 100 may vibrate at a first frequency of 10 Hz. The mass dampers 306 can be tuned to vibrate at a second frequency that is non-integral to the system response, such as 13 Hz or 14 Hz. The vibration of the mass dampers 306 interferes with the vibration of the VSVs 202, and, thus, dampens the vibration of the VSVs 202.

Figure 4A:
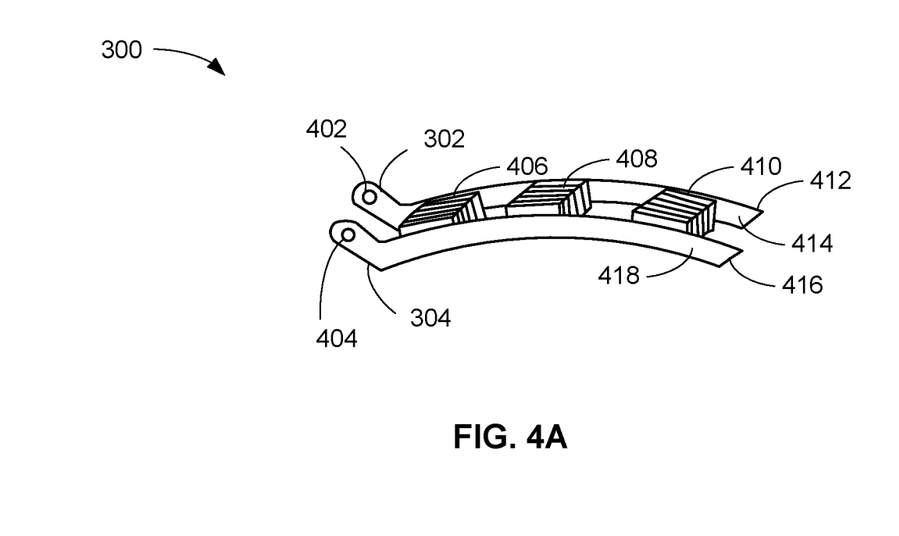
FIGS. 4A and 4B illustrate an example perspective view of the first example inner shroud damper of FIG. 3.

FIG. 4A illustrates an example perspective view of the first inner shroud damper 300 of FIG. 3. The inner shroud damper 300 includes a first joint 402 and a second joint 404. For example, the first carrier 302 is coupled to the inner shroud 226 via the first joint 402 and the second carrier 304 is coupled to the inner shroud 226 via the second joint 404. However, other constructions and/or methods can be used to couple the inner shroud damper 300 to the inner shroud 226. In some examples, the joints 402, 404 can be used to form a means for coupling at least one carrier (e.g., the first carrier 302, the second carrier 304) to an inner shroud (e.g., the inner shroud 226). In some examples, the joints 402, 404 are bolts. However, the joints 402, 404 can be screws, pins, etc.

In the illustrated example of FIG. 4A, the inner shroud damper 300 includes three mass dampers 306. However, the inner shroud damper 300 can include additional or fewer mass dampers 306. For example, the inner shroud damper 300 includes a first mass damper 406, a second mass damper 408, and a third mass damper 410. In the illustrated example of FIG. 4A, the first carrier 302 has a first side 412 and a second side 414 and the second carrier 304 has a first side 416 and a second side 418. The mass dampers 406, 408, 410 are coupled to the second side 414 of the first carrier 302 and the first side 416 of the second carrier 304. In some examples, the number of mass dampers 306 corresponds to the number of VSVs 202 (e.g., a one to one ratio, a two to one ratio, etc.). The mass dampers 306 (e.g., the mass dampers 406, 408, 410) are circumferentially spaced apart. At least the mass dampers 306 (e.g., the first mass damper 406, the second mass damper 408, the third mass damper 410, etc.) can be used to implement a means for damping engine vibration.

Figure 4B:
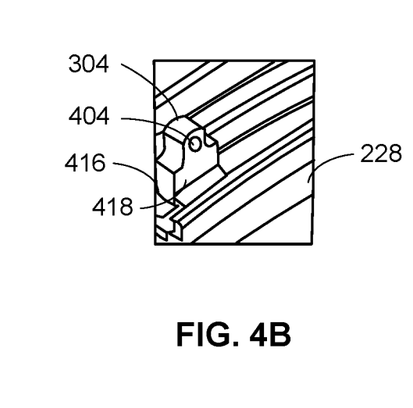

FIG. 4B illustrates an example perspective view of the joint 404. For example, the second carrier 304 is disposed in the seal box 228. The joint 404 of the second carrier 304 can couple the second carrier 304 to the inner shroud 226 (not illustrated).

Figure 5A:
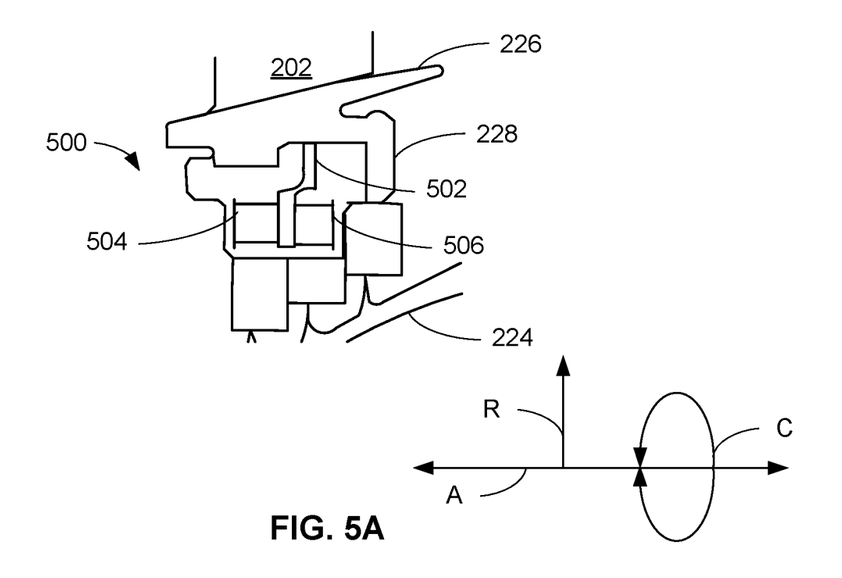
FIG. 5A illustrates an example cross-sectional view of a second example inner shroud damper.

FIG. 5A illustrates an example cross-sectional view of a second example inner shroud damper 500. The illustrated example of FIG. 5A includes a portion of a VSV 202 and the labyrinth seal 224. The inner shroud damper 500 includes an carrier 502, a first mass damper 504, and a second mass damper 506. The carrier 502 is a curved beam structure such that the carrier 502 runs through the seal housing (e.g., the seal box 228) of the inner shroud 226 circumferentially. However, the carrier 502 can be other shapes that integrate with the inner shroud 226. The carrier 502 can be a cantilever bolted arm coupled to the inner shroud 226, for example. In the illustrated example of FIG. 5A, the carrier 502 is disposed between the mass dampers 504, 506. The carrier, as illustrated by the carriers 302, 304, can be any material suitable for the environment and compatible within the shroud and damping systems. For example, the carrier 502 is steel. However, the carrier 502 can additionally or alternatively be titanium alloys, iron or nickel alloys with adequate strength, fatigue, and/or other material characteristics, etc., for vibration damping.

Figure 5B:
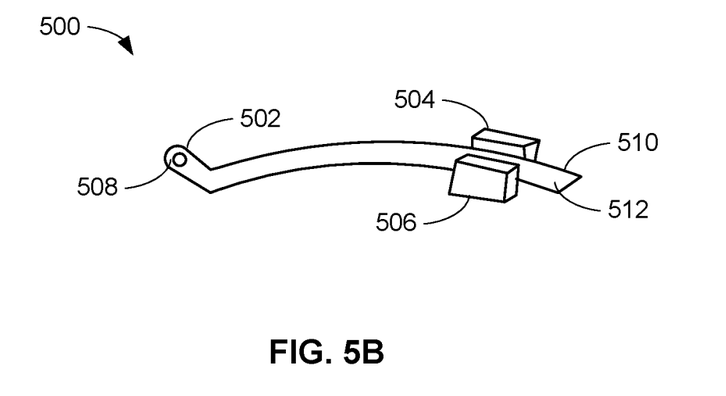
FIG. 5B illustrates an example perspective view of the second example inner shroud damper of FIG. 5A.

FIG. 5B illustrates an example perspective view of the second example inner shroud damper 500 of FIG. 5A. The illustrated example of FIG. 5B includes the carrier 502, the first mass damper 504, the second mass damper 506, and a joint 508. However, other constructions and/or methods can be used to couple the inner shroud damper 500 to the inner shroud 226. The carrier 502 is coupled to the inner shroud 226 via the joint 508. In some examples, the joint 508 is a bolt. However, the joint 508 can be a screw, a pin, etc.

The illustrated example of FIG. 5B includes a pair of mass dampers (e.g., the first mass damper 504 and the second mass damper 506 are aligned). However, the inner shroud damper 500 can include additional or fewer mass dampers (e.g., the mass dampers 504, 506) and/or mass damper pairs. The carrier 502 has a first side 510 and a second side 512. The first mass damper 504 is bolted, brazed, and/or retained to the first side 510 of the carrier 502. The second mass damper 506 is bolted, brazed, and/or retained to the second side 512 of the carrier 502. For example, the mass dampers 504, 506 are integrally brazed or otherwise retained to the carrier 502. In some examples, the mass dampers 504, 506 and the carrier 502 are integrally brazed to the inner shroud 226. In some examples, the mass dampers 504, 506 are honeycomb structures (e.g., an array of hollow cells formed between walls). However, the mass dampers 504, 506 can be inertial masses, a viscoelastic material (e.g., rubber, silicone, etc.), etc. In examples disclosed herein, the mass dampers 504, 506 provide mass damping behavior during engine operation. For example, the mass dampers 504, 506 absorb energy (e.g., vibrational energy) during engine operation and act anti-mode to certain vibration responses. That is, the VSVs 202 vibrate at a first frequency during normal engine operation based on the design parameters of the VSVs 202 (e.g., durability, stiffness, etc.). The mass dampers 504, 506 can be tuned (e.g., designed to have a certain durability, stiffness, weight, etc.) to vibrate at a second frequency during normal engine operation such that the second frequency interferes with the first frequency.

In examples disclosed herein, the second inner shroud damper 500 can include one or more pairs of mass dampers. In some examples, the number of mass damper pairs correspond to the number of VSVs 202 (e.g., a one to one ratio, a two to one ratio, etc.). The pairs of mass dampers are spaced circumferentially. In the illustrated example of FIG. 5B, the pair of mass dampers 504, 506 are aligned relative to each other. In some examples, the first mass damper 504 and the second mass damper 506 are not paired (e.g., the second mass damper 506 is offset with respect to the first mass damper 504).

The inner shroud damper 300 and/or the inner shroud damper 500 can prevent and/or reduce strain caused by engine vibration of the VSVs 202 during normal engine operation. The reduction/prevention of engine vibration increases the reliability of the VSVs 202 and the durability of the VSVs 202. The improved reliability/durability of the VSVs 202 can reduce the risk of stall due to vane locking, for example. Additionally or alternatively, the inner shroud damper 300 and/or the inner shroud damper 500 reduces the weight, cost, etc., of the gas turbine engine 100.

In operation, the inner shroud damper(s) (e.g., the inner shroud damper 300 and/or the inner shroud damper 500) coupled to the inner shroud 226 within the seal box 228 provides damping to act anti-mode to vibrations generated by the gas turbine engine 100. That is, the examples disclosed herein increase reliability/durability of gas turbine engines by decreasing vibration of the gas turbine engines (e.g., vibration of one or more airfoils, etc.). In some examples, the inner shroud damper(s) prevent engine vibration, which reduces the distortions and/or strain caused by gas turbine operation.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Example methods, apparatus, systems, and articles of manufacture to reduce vibration are disclosed herein.

Further aspects of the invention are provided by the subject matter of the following clauses. Example 1 includes an inner shroud damper for a gas turbine engine, the inner shroud damper comprising at least one carrier including a joint to couple to an inner shroud, the at least one carrier having a first side and a second side, and at least one mass damper coupled to the at least one carrier.

Example 2 includes the inner shroud damper of any preceding clause, wherein the at least one carrier is a curved beam structure.

Example 3 includes the inner shroud damper of any preceding clause, wherein the at least one carrier is disposed inside a seal box, the seal box coupled to the inner shroud.

Example 4 includes the inner shroud damper of any preceding clause, wherein the joint is a bolt.

Example 5 includes the inner shroud damper of any preceding clause, wherein the at least one mass damper is tuned to act anti-mode to engine vibration based on at least one of durability, stiffness, or weight.

Example 6 includes the inner shroud damper of any preceding clause, wherein the at least one mass damper is a honeycomb structure.

Example 7 includes the inner shroud damper of any preceding clause, wherein the at least one carrier is a first carrier and the joint is a first joint, further including a second carrier including a second joint to couple to the inner shroud, the second carrier having a first side and a second side.

Example 8 includes the inner shroud damper of any preceding clause, wherein the at least one mass damper is coupled to the second side of the first carrier and the first side of the second carrier.

Example 9 includes the inner shroud damper of any preceding clause, wherein the at least one mass damper is a first mass damper, further including a second mass damper coupled to the second side of the first carrier and the first side of the second carrier, the second mass damper spaced circumferentially apart from the first mass damper.

Example 10 includes the inner shroud damper of any preceding clause, wherein the at least one mass damper is a first mass damper coupled to the first side of the at least one carrier, further including a second mass damper coupled to the second side of the at least one carrier.

Example 11 includes the inner shroud damper of any preceding clause, wherein the first mass damper and the second mass damper are aligned.

Example 12 includes the inner shroud damper of any preceding clause, wherein the first mass damper is offset from the second mass damper.

Example 13 includes a gas turbine engine comprising an inner shroud, a seal box coupled to the inner shroud, and an inner shroud damper including at least one carrier disposed inside the seal box, the at least one carrier including a joint to couple to the inner shroud and at least one mass damper coupled to the at least one carrier.

Example 14 includes the gas turbine engine of any preceding clause, wherein the at least one carrier is a curved beam structure.

Example 15 includes the gas turbine engine of any preceding clause, wherein the at least one mass damper is tuned to act anti-mode to engine vibration based on at least one of durability, stiffness, or weight.

Example 16 includes the gas turbine engine of any preceding clause, wherein the at least one mass damper is a honeycomb structure.

Example 17 includes the gas turbine engine of any preceding clause, wherein the at least one carrier is a first carrier and the joint is a first joint, further including a second carrier including a second joint to couple to the inner shroud, the second carrier having a first side and a second side.

Example 18 includes the gas turbine engine of any preceding clause, wherein the at least one mass damper is coupled to the second side of the first carrier and the first side of the second carrier.

Example 19 includes the gas turbine engine of any preceding clause, wherein the at least one mass damper is a first mass damper coupled to the first side of the at least one carrier, further including a second mass damper coupled to the second side of the at least one carrier.

Example 20 includes an inner shroud damper for a gas turbine engine, the inner shroud damper comprising means for coupling at least one carrier to an inner shroud, and means for damping engine vibration, the means for damping coupled to the at least one carrier.

The following claims are hereby incorporated into this Detailed Description by this reference, with each claim standing on its own as a separate embodiment of the present disclosure.

What is claimed is:

1. An inner shroud damper for a gas turbine engine, the inner shroud damper comprising:
   at least one carrier including:
   a curved structure having a first axial facing side and a second axial facing side;
   a joint extending in a radial direction from the curved structure, the joint configured to couple to an inner shroud of the gas turbine engine; and
   at least one mass damper coupled directly to the first axial facing side or the second axial facing side of the at least one carrier, the at least one mass damper including a honeycomb structure.

2. The inner shroud damper of claim 1, where the curved structure is to extend circumferentially about the gas turbine engine.

3. The inner shroud damper of claim 1, wherein the at least one carrier is disposed inside a seal box, the seal box coupled to the inner shroud.

4. The inner shroud damper of claim 1, wherein the joint is a bolt.

5. The inner shroud damper of claim 1, wherein the at least one mass damper is tuned to act anti-mode to engine vibration based on at least one of durability, stiffness, or weight.

6. The inner shroud damper of claim 1, wherein the at least one carrier is a first carrier and the joint is a first joint, further including a second carrier including a second joint to couple to the inner shroud, the second carrier having a first side and a second side.

7. The inner shroud damper of claim 6, wherein the at least one mass damper is coupled to the second side of the first carrier and the first side of the second carrier.

8. The inner shroud damper of claim 6, wherein the at least one mass damper is a first mass damper, further including a second mass damper coupled to the second side of the first carrier and the first side of the second carrier, the second mass damper spaced circumferentially apart from the first mass damper.

9. The inner shroud damper of claim 1, wherein the at least one mass damper is a first mass damper coupled to the first side of the at least one carrier, further including a second mass damper coupled to the second side of the at least one carrier.

10. The inner shroud damper of claim 9, wherein the first mass damper and the second mass damper are aligned.

11. The inner shroud damper of claim 9, wherein the first mass damper is offset from the second mass damper.

12. A gas turbine engine comprising:
    an inner shroud;
    a seal box coupled to the inner shroud; and
    an inner shroud damper including at least one carrier disposed inside the seal box, the at least one carrier including:
    a curved structure having a first axial facing side and a second axial facing side;
    a joint extending in a radial direction from the curved structure, the joint configured to couple the curved structure to the inner shroud; and
    at least one mass damper coupled directly to the first axial facing side or the second axial facing side of the at least one carrier, the at least one mass damper including a honeycomb structure.

13. The gas turbine engine of claim 12, wherein the curved structure is to extend circumferentially about the gas turbine engine.

14. The gas turbine engine of claim 12, wherein the at least one mass damper is tuned to act anti-mode to engine vibration based on at least one of durability, stiffness, or weight.

15. The gas turbine engine of claim 12, wherein the at least one carrier forms a cantilever arm with the inner shroud.

16. The gas turbine engine of claim 12, wherein the at least one carrier is a first carrier and the joint is a first joint, further including a second carrier including a second joint to couple to the inner shroud, the second carrier having a first side and a second side.

17. The gas turbine engine of claim 16, wherein the at least one mass damper is coupled to the second side of the first carrier and the first side of the second carrier.

18. The gas turbine engine of claim 12, wherein the at least one mass damper is a first mass damper coupled to a first side of the at least one carrier, further including a second mass damper coupled to a second side of the at least one carrier.

* * * * *